Figure 1:
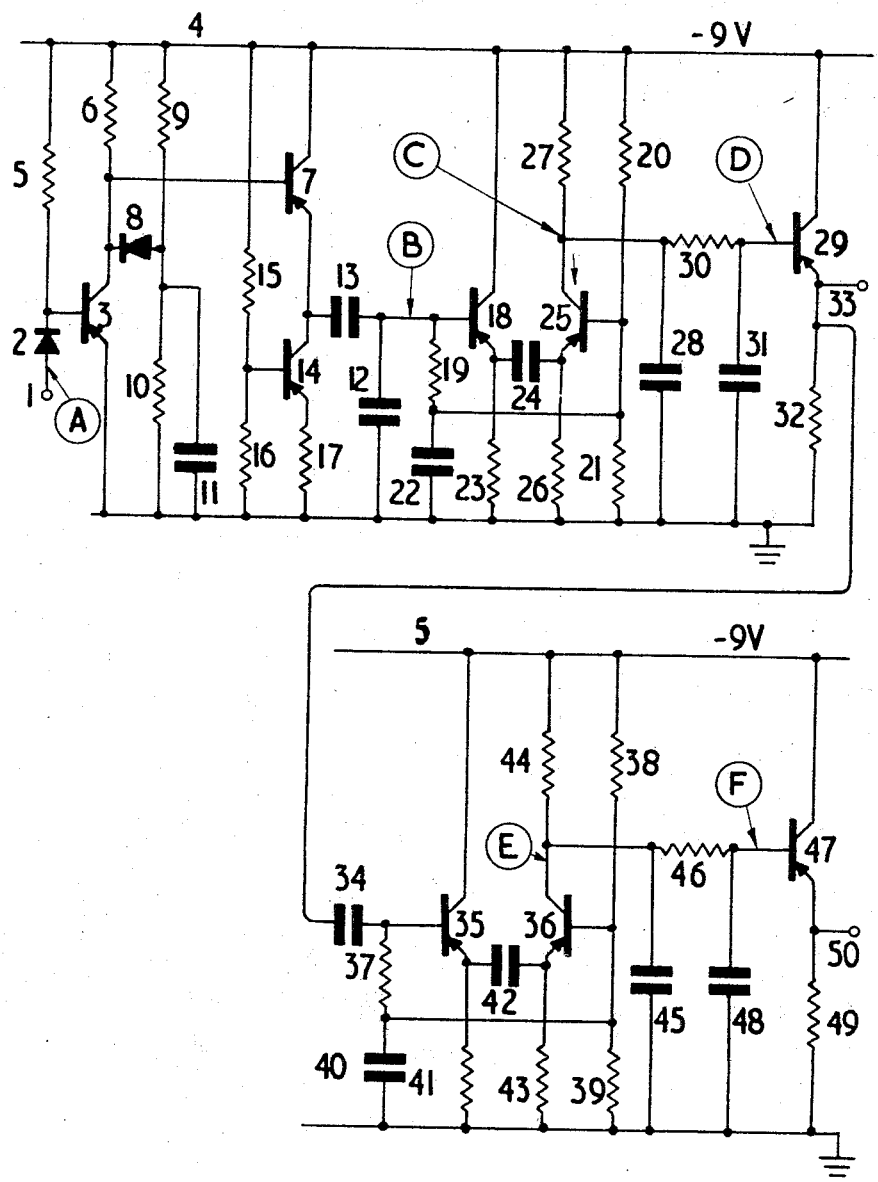

United States Patent Office 3,322,973
Patented May 30, 1967

3,322,973
VOLTAGE GENERATOR PRODUCING CONSTANT AMPLITUDE, 90° PHASE - DISPLACED SAWTOOTH WAVEFORMS OVER WIDE RANGE OF OUTPUT FREQUENCIES
John Lewis Edwin Baldwin, Croydon, England, assignor to Rank-Bush Murphy Limited
Filed Jan. 12, 1965, Ser. No. 424,968
Claims priority, application Great Britain, Jan. 31, 1964, 4,185/64
7 Claims. (Cl. 307—88.5)

This invention relates to a two-phase voltage generator, that is a generator producing alternating voltages of like waveform and amplitude but differing in phase by 90°. Voltages of this kind are often required in the field of control electronics, especially for feeding to the field windings of a goniometer or resolver, from the movable winding of which there may then be taken a voltage having an arbitrarily adjustable phase relation to the field voltages.

It is an object of the present invention to provide a two-phase voltage generator which will from an initial impulse train develop a two-phase alternating voltage supply.

It is a further object of the invention to provide a voltage generator yielding a two-phase supply locked in phase to a controlling impulse train.

Another object of the invention is to provide a two-phase generator capable of operating over a relatively wide frequency range.

The invention also seeks to provide a two-phase voltage generator yielding output signals of invariant phase relation over a relatively wide frequency range.

Again, the invention seeks to provide a two-phase voltage generator in which the individual phase voltages remain equal in amplitude over a wide range of output frequencies.

In one embodiment, a two-phase voltage generator in accordance with the invention may comprise means for generating a first voltage of rectilinear time-symmetric waveform, varying cyclically between extreme values. This first voltage is applied to trigger means responsive to the passage of an applied signal through predetermined threshold levels to develop a two-valued signal. The threshold levels of the trigger means are so chosen that the transitions from one said value to the other in its output signal occur at times differing substantially equally from the times at which said first voltage attains its extreme values. The output voltage from the trigger means is applied to integrating means yielding a signal representing the time-integral of an applied voltage. The output signal from the integrating means thus provides a cyclically repetitive signal of rectilinear time-symmetric waveform like to said first voltage but displaced in phase by 90° with respect thereto.

As used in the present specification and generally understood in the art the expression "a triangular waveform voltage" is a voltage which changes from a first to a second value linearly with time and then changes linearly with time and at the same rate back to its first value, while the expression "a sawtooth waveform voltage" is a voltage which changes linearly with time from a first to a second value, from which it returns to the first value in a time very much less than the time taken to reach the second value.

Figure 2:
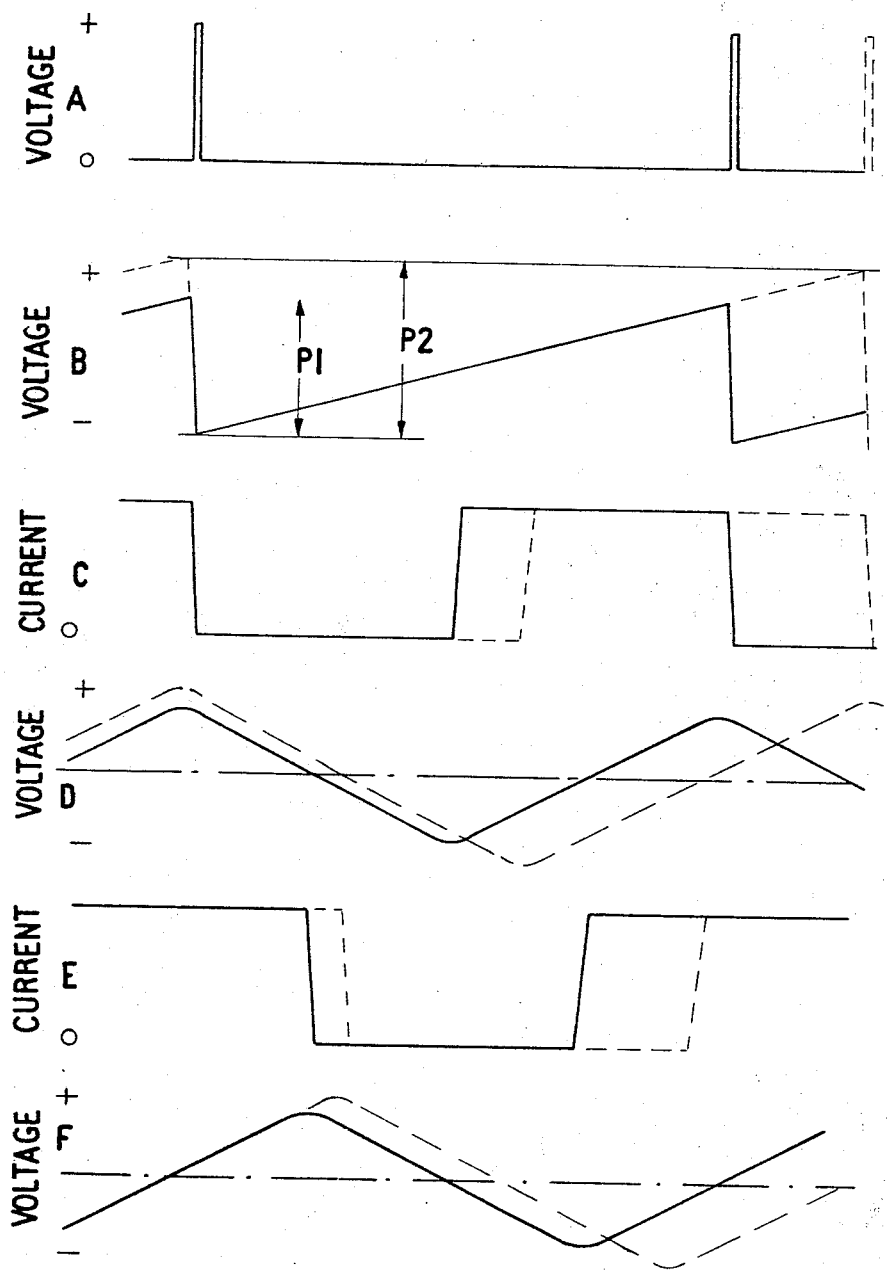

The features of the invention which are believed to be novel are recited with particularity in the appended claims. Features and advantages of the invention will appear from the following description of an embodiment thereof, given by way of example, in conjunction with the accompanying drawings, in which:

FIGURE 1 is a circuit diagram illustrating one embodiment of circuit arrangement according to the present invention, and FIGURE 2 comprises a series of waveform diagrams illustrating the operation of the circuit arrangement described with reference to FIGURE 1.

To the circuit arrangement shown in FIGURE 1 there is applied at an input terminal 1 from a conventional source (not shown) a control signal including positive-going pulses repetitive at the periodicity of the two-phase voltages which it is required to generate. A signal such as the positive-going pulses illustrated by FIGURE 2A is suitable. This positive-going transient causes a diode 2 to conduct and thus drives the base of a transistor 3 positively. Transistor 3 is arranged to be normally bottomed, its emitter being connected to the grounded positive line while its base and collector are returned to the negative line 4 by way of suitably chosen resistors 5 and 6 respectively. When transistor 3 is cut off by the positive-going signal applied to its base there arises at its collector a negative-going pulse which is liimted by the diode 8 to a potential determined by the potential appearing at the tapping of a potential divider formed by resistors 9 and 10 connected in series across the supply and is applied directly to the base of a further transistor 7. The tapping of voltage divider 9, 10, to which the anode of diode 8 is returned, is bypassed to ground by way of a capacitor 11. When transistor 7 is caused to pass current by the negative-going pulse applied to its base, its emitter assumes substantially the potential of the junction of resistors 9 and 10, charging a capacitor 12 of which one terminal is grounded and the other is connected to the emitter of transistor 7 by way of an isolating capacitor 13 of high value. When the drive pulse ceases and transistor 7 again becomes cut off, capacitor 12 discharges by way of capacitor 13 and a transistor 14 which, by reason of a resistor 17 in its emitter lead and the fact that its base is returned to the tapping of a potential divider formed by resistors 15 and 16 connected in series across the supply, acts as a constant-current device. The potential across capacitor 12, which is illustrated by waveform 2B, therefore changes linearly with time until the next drive pulse is applied to the base of transistor 7. There thus arises across capacitor 12 the sawtooth waveform voltage illustrated by 2B. It will be appreciated that the amplitude P of this sawtooth voltage will vary inversely with the repetition rate of the drive pulses, as indicated by the waveform shown in broken line in FIGURE 2B, which shows the change in sawtooth voltage resulting when the second drive pulse shown in FIGURE 2A is delayed to the position shown in broken line in that waveform.

It is of course possible to stabilise the amplitude of the sawtooth waveform, yielding the advantage that the circuit arrangement may conveniently be employed over a wider range of input frequencies. The arrangement used to stabilise the sawtooth voltage may be of the kind in which a peak rectifier fed with the sawtooth voltage yields a potential, proportional to the peak amplitude of the sawtooth signal, which is applied to minimise changes in that peak amplitude.

The sawtooth voltage arising across capacitor 12 is applied directly to the base of a transistor 18 across a resistor 19, through which the base of transistor 18 is returned to the tapping of a potential divider formed by resistors 20 and 21 connected in series across the supply. The tapping of potential divider 20, 21 is bypassed to ground by way of a capacitor 22. Transistor 18 has its collector returned directly to the negative supply line 4 and its emitter is returned through a resistor 23 to the grounded positive line and is coupled by way of a capacitor 24 to the emitter of another, similar transistor 25 having an emitter-lead resistor 26 of the same value as or slightly less than that of resistor 23. The base of transistor 25 is connected directly to the tapping of voltage divider 20, 21 and its collector is returned to the negative supply by way of a load resistor 27. It will now be shown that this form of circuit may be arranged to adjust itself to yield a square-wave voltage at its output, that is, a rectangular signal with a 1:1 mark:space ratio, even though the drive frequency varies.

When transistor 18 is conductive and transistor 25 is cut off, a current of which the value is determined by the base potential of transistor 18 will flow in the emitter circuit of that transistor, being drawn in part through resistor 26 in the emitter circuit of transistor 25 by way of coupling capacitor 24 and in part through resistor 23 in the emitter lead of transistor 18 itself. For simplicity in description the value of capacitor 24 will be assumed to be so large that no appreciable change in potential arises across it during a cycle of operation. When transistor 25 is conductive and transistor 18 cut off, transistor 25 draws its emitter current in part through its own emitter lead resistor 26 and for the remainder by way of coupling capacitor 24 through the emitter lead resistor 23 of transistor 18. If the values of resistors 23 and 26 are so chosen that the mean current flowing in resistor 23 when transistor 18 is cut off is the same as the mean current flowing in resistor 26 when transistor 25 is cut off then, since there can be no net flow of direct current through coupling capacitor 24 the potential across it must change to a value such that the current flows through capacitor 24 for equal times in the two directions. Since a change in the direction of flow of current in capacitor 24 corresponds to a change from the condition in which one of transistors 18, 25 is conductive to that condition in which the other of these transistors is conductive, the output currents from the two transistors must flow for the same length of time, yielding a 1:1 mark:space ratio in the signal appearing at the collector of transistor 25, even though the frequency and amplitude of the drive pulses may vary substantially.

The variation in the current flowing in transistor 25 is shown by waveform 2C, where the waveforms in solid and in broken line again correspond respectively to the two periodicities of controlling signal similarly denoted in waveforms 2A and 2B.

The signal arising at the collector of transistor 25 is in fact integrated by the presence of a capacitor 28 connected from the collector to earth and slight remaining errors are compensated by a series resistor 30 and a shunt capacitor 31, the signal appearing at the junction of which is applied to the base of a further transistor 29. The voltage waveform thus arising at the base of transistor 29 is of triangular waveform, as illustrated by waveform D in FIGURE 2, falling linearly for half the periodic time and rising linearly during the remaining half.

When the periodicity changes, the amplitude of the triangular voltage varies inversely, as may be seen from the full and broken-line waveforms of FIGURE 2D, but the mean value, indicated by the chain line, remains constant. This triangular waveform is developed at low impedance across an emitter load resistor 32 of transistor 29, from which it is connected firstly to an output terminal 33 and secondly by way of a capacitor 34 to the base of a transistor 35, which with another transistor 36 and their associated components forms a circuit identical with that previously described with reference to transistor 18 and 25. The base of transistor 35 is returned by way of a resistor 37 to the tapping of a voltage divider comprising resistors 38 and 39 which are connected in series across the supply. The base of transistor 36 is connected directly to the tapping of the voltage divider 38, 39, which point is also bypassed to ground by way of a capacitor 40.

The collector of transistor 35 is connected directly to the negative supply line, while its emitter is returned to the positive line by way of a resistor 41 and is also coupled to the emitter of transistor 36 by way of a high-value capacitor 42. The emitter of transistor 36 is returned to the positive line by way of a resistor 43, while its collector is taken to the negative line by way of a load resistor 44, which together with a capacitor 45 connected from the collector to the grounded positive line perform an initial integration of the square-wave current, illustrated by waveform 2E, which arises in transistor 36. This integration is completed by a further resistor 46 connecting the collector of transistor 36 to the base of a further transistor 47 and another capacitor 48 connected from this base to the grounded positive line. The voltage appearing at the base of transistor 47 thus has the waveform represented by diagram 2F, from which it will be seen to be a voltage of triangular waveform displaced by 90° with respect to waveform 2D. This voltage appears at low impedance across the emitter load resistor 49 of transistor 47 and is made available as the second phase voltage at an output terminal 50.

It is an advantage of the arrangement according to the present invention that the phase quadrature of the two-phase output signals remains unaffected by changes in the repetition rate of the drive pulses over a very wide range and that though the amplitudes of the phase voltages vary with frequency, they vary exactly equally and thus have no untoward effect upon the operation of goniometer-type apparatus which may be fed with these voltages.

In a practical circuit for operation at frequencies of the order of 250 c./s., typical component values for which are listed below, the very high values of coupling capacitors 24 and 42 make it desirable to employ electrolytic capacitors in these positions. In order to apply a suitable polarising voltage to such electrolytic capacitors it is found convenient to produce a voltage offset in the working points of the two transistors forming each trigger pair. This may conveniently be done by connecting a resistor of suitable value from the negative line to the base of each of transistors 18 and 35. These resistors may have values of 68KΩ each.

Component values suitable for use in the circuit arrangement described above in relation to the drawings are as follows:

*Resistors*

| | |
|---|---|
| 5 | 100KΩ |
| 6 | 3.3KΩ |
| 9 | 1KΩ |
| 10 | 2.2KΩ |
| 15 | 10KΩ |
| 16 | 1KΩ |
| 17 | 1KΩ |
| 19 | 10KΩ |
| 20 | 6.8KΩ |
| 21 | 2.2KΩ |
| 23 | 8.2KΩ |
| 26 | 6.8KΩ |
| 27 | 15KΩ |
| 30 | 470Ω |
| 32 | 3.3KΩ |
| 37 | 10KΩ |
| 38 | 6.8KΩ |
| 39 | 2.2KΩ |
| 41 | 8.2KΩ |
| 43 | 6.8KΩ |
| 44 | 15KΩ |
| 46 | 470Ω |
| 49 | 3.3KΩ |

Capacitors

| | μf. |
|---|---|
| 11 | 30 |
| 12 | 1 |
| 13 | 30 |
| 22 | 30 |
| 24 | 30 |
| 28 | 0.47 |
| 31 | 0.047 |
| 34 | 30 |
| 40 | 30 |
| 42 | 30 |
| 45 | 0.47 |

It will be apparent to those skilled in the art that the triangular waveform developed at output terminal 33 may be produced by circuit means other than that specifically described and the present invention is therefore not to be taken as limited to apparatus in which similar circuit arrangements are used to produce both the first and second triangular voltage waveforms.

It will be obvious also that the triangular two-phase output voltages developed by the circuit arrangement described in detail above may readily be applied to control the production of similarly phased sinusoidal voltages, when these are required.

I claim:

1. A two-phase voltage generator comprising in combination: means generating a first voltage of rectilinear, time-symmetric waveform, varying cyclically between extreme values, trigger means responsive to the passage of an applied voltage through predetermined threshold levels to develop a two-valued signal; means applying said first voltage to said trigger means, said threshold levels being such that transitions from each said value to the other in said output signal occur at times differing substantially equally from the times at which said first voltage attains said extreme values; integrating means producing an output signal representing the time-integral of an applied voltage; and means applying said two-valued signal to said integrating means, whereby said integrating means produces a second cyclically repetitive signal of rectilinear time-symmetric waveform similar to said first voltage but displaced in phase with respect thereto by 90°.

2. A two-phase voltage generator comprising, in combination: circuit means generating a first voltage of triangular waveform having predetermined extreme values, a trigger circuit producing an output signal having a first or a second value according as an applied signal rises above a first threshold value or falls below a second threshold value; means applying said first voltage to said trigger circuit, said threshold values being such that transitions from one to the other of said values in said output signal occur at times differing substantially equally from the times of peak excursions in said first voltage; an integrating circuit producing an output signal proportional to the time-integral of an applied voltage; and means applying said two-valued signal to said integrating circuit, whereby said integrating circuit yields a second voltage of triangular waveform but displaced in phase with respect thereto by 90°.

3. A two-phase voltage generator in accordance with claim 2 in which said circuit means generating said first voltage comprises the combination of means generating a voltage of sawtooth waveform; second trigger means responsive to the passage of an applied signal through predetermined threshold levels to develop a second two-valued signal; means applying said sawtooth voltage to said second trigger means, said threshold levels being such that transitions in said second two-valued signal are separated by equal time intervals; second integrating means producing an output signal representing the time-integral of an applied voltage; and means applying said second two-valued signal to said second integrating means, whereby said second integrating means produces said first voltage.

4. A two-phase voltage generator comprising, in combination: generator means for generating a train of voltage pulses; a pulse-driven sawtooth generator comprising a capacitor, means continuously changing the potential on said capacitor in a first sense; pulse controlled means for applying to said capacitor a predetermined potential change in a second sense opposite to said first sense; circuit means applying said pulse train to said pulse-controlled means of said sawtooth generator whereby said generator produces a sawtooth voltage; first trigger means responsive to the passage of an applied signal through predetermined threshold levels to develop a first two-valued signal; circuit applying said sawtooth voltage to said first trigger means, said threshold levels being such that transitions from each said value to the other in said first two-valued signal occur at substantially equal intervals; first integrating means producing an output signal representing the time-integral of an applied voltage; means applying said first two-valued signal to said first integrating means, whereby said first integrating means produces as output signal a first voltage of triangular waveform; second trigger means responsive to the passage of an applied signal through predetermined threshold levels to produce a second two-valued signal; means applying said first voltage of triangular waveform to said second trigger means, said threshold levels being such that said second two-valued signal contains transitions from one to the other of said values equally spaced in time from those in said first two-valued signal; second integrating means producing an output signal representing the time-integral of an applied voltage; means applying said second two-valued signal to said second integrating means to develop a second voltage of triangular waveform displaced in phase by 90° with respect to said first voltage of triangular waveform.

5. A two-phase voltage generator in accordance with claim 4, in which said pulse-driven sawtooth generator comprises a first transistor having an emitter, a base and a collector; a source of direct current having first and second poles; a load resistor connected between said collector and said first pole of said source, a resistor returning said base to said first pole; a direct connection between said emitter and said second pole of said source; an input terminal; a diode, poled to pass signals cutting off said transistor, connecting said input terminal to said base; first and second voltage divider resistors joined in series across said supply; a diode connected between said collector and a point at a predetermined potential in such polarity as to limit the voltage excursion at said collector when said first transistor is cut off; a second transistor having a base, an emitter and a collector; a constant-current device connected between said emitter of said second transistor and said second pole of said source; a direct connection from said collector of said second transistor to said first pole of said source; a capacitor having two terminals; a direct connection from one said capacitor terminal to said second pole of said source; a connection from the other said capacitor terminal to said emitter of said second transistor; an output terminal; and a direct connection from said one capacitor terminal to said output terminal.

6. A two-phase voltage generator in accordance with claim 4, in which said trigger circuits each comprise the combination of: first and second transistors each having a base, an emitter and a collector; an input terminal; a direct connection from said input terminal to said base of said first transistor; a source of direct current having first and second poles; emitter resistors connecting said emitters respectively to said second pole of said source; a capacitor connected between said emitters; a source of bias voltage; a direct connection between the base of said second transistor and said bias source; a resistor connecting the base of said first transistor to said bias source; a direct connection between said collector of said first transistor and said first pole of said current source; a load resistor connected between said collector of said second transistor and said first pole of said current source; an output terminal; and a direct connection from said collector of said second transistor to said output terminal.

7. A two-phase voltage generator in accordance with claim 4 in which second said integrating means is constituted by a transistor having a base; an emitter and a collector; a current source having first and second poles, a load resistor connected between said collector and said first pole of said source; a first capacitor connected between said collector and said second pole; an output terminal; a resistor connecting said collector to said output terminal and a second capacitor connecting said output terminal to said second pole of said source.

References Cited
UNITED STATES PATENTS

| | | | |
|---|---|---|---|
| 2,572,792 | 10/1951 | White | 328—104 X |
| 3,095,508 | 6/1963 | Karsh | 307—88.5 |
| 3,227,895 | 1/1966 | Gray | 307—88.5 |
| 3,255,416 | 6/1966 | Stella | 307—88.5 |

ARTHUR GAUSS, *Primary Examiner.*

J. S. HEYMAN, *Assistant Examiner.*